(12) United States Patent
Kanazawa et al.

(10) Patent No.: US 10,447,184 B2
(45) Date of Patent: Oct. 15, 2019

(54) ROTATING ELECTRICAL MACHINE AND ROTATING ELECTRICAL MACHINE SYSTEM

(71) Applicant: Hitachi Automotive Systems Engineering, Ltd., Hitachinaka-shi, Ibaraki (JP)

(72) Inventors: Hiroshi Kanazawa, Hitachinaka (JP); Kenji Nakayama, Hitachinaka (JP); Hideyuki Hara, Hitachinaka (JP)

(73) Assignee: Hitachi Automotive Systems Engineering, Ltd., Hitachinaka-shi (JP)

( * ) Notice: Subject to any disclaimer, the term of this patent is extended or adjusted under 35 U.S.C. 154(b) by 0 days.

(21) Appl. No.: 15/779,043

(22) PCT Filed: Nov. 18, 2016

(86) PCT No.: PCT/JP2016/084191
§ 371 (c)(1),
(2) Date: May 24, 2018

(87) PCT Pub. No.: WO2017/090514
PCT Pub. Date: Jun. 1, 2017

(65) Prior Publication Data
US 2018/0351482 A1 Dec. 6, 2018

(30) Foreign Application Priority Data

Nov. 27, 2015 (JP) .................................. 2015-231917

(51) Int. Cl.
*H02P 6/10* (2006.01)
*H02K 3/28* (2006.01)
(Continued)

(52) U.S. Cl.
CPC .............. *H02P 6/10* (2013.01); *B62D 5/0403* (2013.01); *B62D 5/046* (2013.01); *B62D 5/0484* (2013.01);
(Continued)

(58) Field of Classification Search
CPC .. H02P 6/10; H02P 25/18; H02P 25/22; H02P 2207/05; B62D 5/0403;
(Continued)

(56) References Cited

U.S. PATENT DOCUMENTS

2005/0046296 A1 * 3/2005 Nakamura ........... B62D 5/0403
310/179
2011/0181230 A1 7/2011 Yamada et al.
(Continued)

FOREIGN PATENT DOCUMENTS

JP 9-275699 A 10/1997
JP 2003-153579 A 5/2003
(Continued)

OTHER PUBLICATIONS

International Search Report (PCT/ISA/210) issued in PCT Application No. PCT/JP2016/084191 dated Feb. 14, 2017 with English translation (five (5) pages).
(Continued)

*Primary Examiner* — Bickey Dhakal
*Assistant Examiner* — Zemenay T Truneh
(74) *Attorney, Agent, or Firm* — Crowell & Moring LLP

(57) ABSTRACT

Provided is a rotating electrical machine in which torque ripple can be decreased at the time of one-side electrical current supply. A motor includes a stator coil constituted by concentrated windings arranged to teeth where an integer N≥2. The stator coil includes first and second winding units and each of which is constituted by windings and which are independent from each other, the windings constituting the
(Continued)

first winding unit are arranged in three teeth groups, each of which includes adjacent teeth and which are provided at 120-degree pitches in terms of mechanical angle, and the windings constituting the second winding unit are arranged in teeth which are the teeth not included in the three teeth groups. That is, the windings constituting the second winding unit are also arranged in three teeth groups, which are provided at 120-degree pitches in terms of mechanical angle.

3 Claims, 17 Drawing Sheets

(51) Int. Cl.
*H02P 25/18* (2006.01)
*H02K 29/03* (2006.01)
*B62D 5/04* (2006.01)
*H02P 25/22* (2006.01)
*B62D 6/10* (2006.01)
*H02K 16/04* (2006.01)

(52) U.S. Cl.
CPC ............. *B62D 5/0487* (2013.01); *H02K 3/28* (2013.01); *H02K 29/03* (2013.01); *H02P 25/18* (2013.01); *H02P 25/22* (2013.01); *B62D 5/04* (2013.01); *B62D 6/10* (2013.01); *H02K 16/04* (2013.01); *H02K 2213/12* (2013.01); *H02P 2207/05* (2013.01)

(58) Field of Classification Search
CPC .... B62D 5/046; B62D 5/0484; B62D 5/0487; B62D 5/04; B62D 6/10; H02K 3/28; H02K 29/03; H02K 16/04; H02K 2213/12
USPC ..................................... 318/400.23; 310/179
See application file for complete search history.

(56) References Cited

U.S. PATENT DOCUMENTS

2016/0315528 A1* 10/2016 Takizawa ............... H02K 29/03
2017/0111003 A1 4/2017 Kikuchi et al.

FOREIGN PATENT DOCUMENTS

| JP | 2005-73398 A | 3/2005 |
| JP | 2010-11688 A | 1/2010 |
| JP | 2011-114941 A | 6/2011 |
| WO | WO 2015/141796 A1 | 9/2015 |

OTHER PUBLICATIONS

Japanese-language Written Opinion (PCT/ISA/237) issued in PCT Application No. PCT/JP2016/084191 dated Feb. 14, 2017 (five (5) pages).

* cited by examiner

FIG. 6

| NUMBER OF POLES \ NUMBER OF SLOTS | 3 | 6 | 9 | 12 | 15 | 18 |
|---|---|---|---|---|---|---|
| 2 | O | | | | | |
| 4 | | O | | | | |
| 6 | | | | | | |
| 8 | | O | | O | | |
| 10 | | | | O | | |
| 12 | | | | | | O |
| 14 | | | | O | | O |
| 16 | | | | O | | O |

COMPARATIVE EXAMPLE
(8P-12S)

FIRST WINDING UNIT 51

SECOND WINDING UNIT 52

FIRST WINDING UNIT 51

SECOND WINDING UNIT 52

FIRST WINDING UNIT 51

SECOND WINDING UNIT 52

FIRST WINDING UNIT 51

SECOND WINDING UNIT 52

(14P-18S)

FIRST WINDING UNIT 51

SECOND WINDING UNIT 52

FIRST WINDING UNIT 51

SECOND WINDING UNIT 52

ROTATING ELECTRICAL MACHINE AND ROTATING ELECTRICAL MACHINE SYSTEM

TECHNICAL FIELD

The present invention relates to a rotating electrical machine and a rotating electrical machine system.

BACKGROUND ART

As a rotating electrical machine including dual winding groups, a rotating electrical machine described in PTL 1 is known. The rotating electrical machine described in PTL 1 has a configuration in which driving current is supplied to two Y connections provided in the rotating electrical machine from two inverters independently to have redundancy.

CITATION LIST

Patent Literature

PTL 1: JP 2010-11688 A

SUMMARY OF INVENTION

Technical Problem

Meanwhile, in a case where each of three-phase two-Y windings is constituted by a concentrated winding, and in which one inverter is stopped due to, e.g., a failure while a motor is driven only by a three-phase winding group driven by the other inverter, a magnetic imbalance of the windings may occur, which may increase torque ripple.

Solution to Problem

According to a first embodiment of the present invention, a rotating electrical machine includes: a stator iron core including 6N teeth where an integer N≥2; and a stator winding including concentrated windings arranged to the respective 6N teeth, wherein the stator winding includes a first three-phase winding and a second three-phase winding each of which is constituted by the 3N windings and which are independent from each other, wherein the 3N windings constituting the first three-phase winding are arranged in three teeth groups each of which includes N adjacent teeth and which are provided at 120-degree pitches in terms of mechanical angle, and wherein the 3N windings constituting the second three-phase winding are arranged in teeth which are the 6N teeth not included in the three teeth groups.

Advantageous Effects of Invention

According to the present invention, torque ripple can be decreased at the time of one-side electrical current supply.

BRIEF DESCRIPTION OF DRAWINGS

FIG. 6 illustrates combinations for a concentrated winding configuration that can be achieved by dual winding arrangement.

DESCRIPTION OF EMBODIMENTS

Hereinbelow, embodiments of the present invention will be described with reference to the drawings.

First Embodiment

Figure 1:
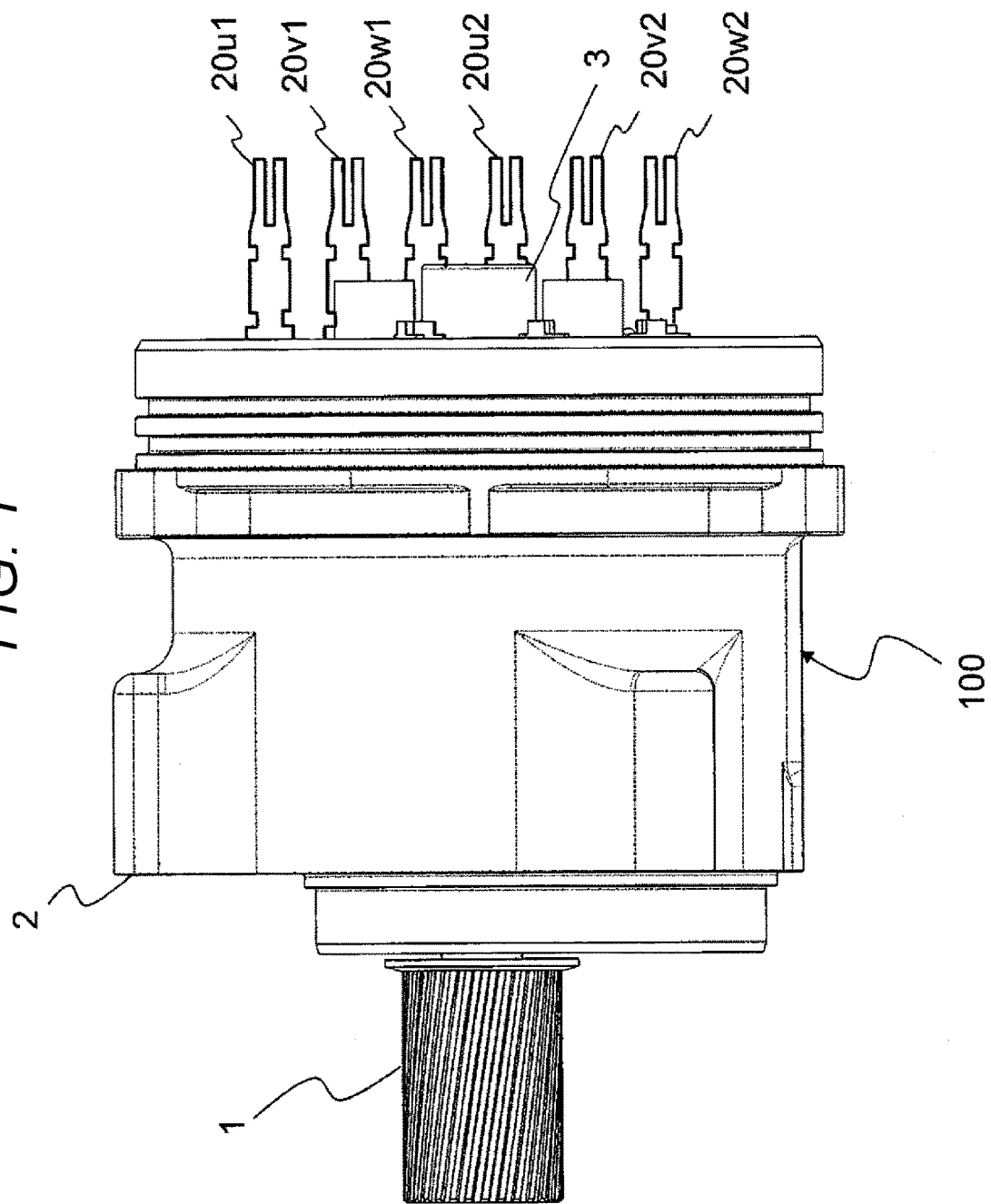
FIG. 1 illustrates a first embodiment of a rotating electrical machine according to the present invention.
Figure 2:
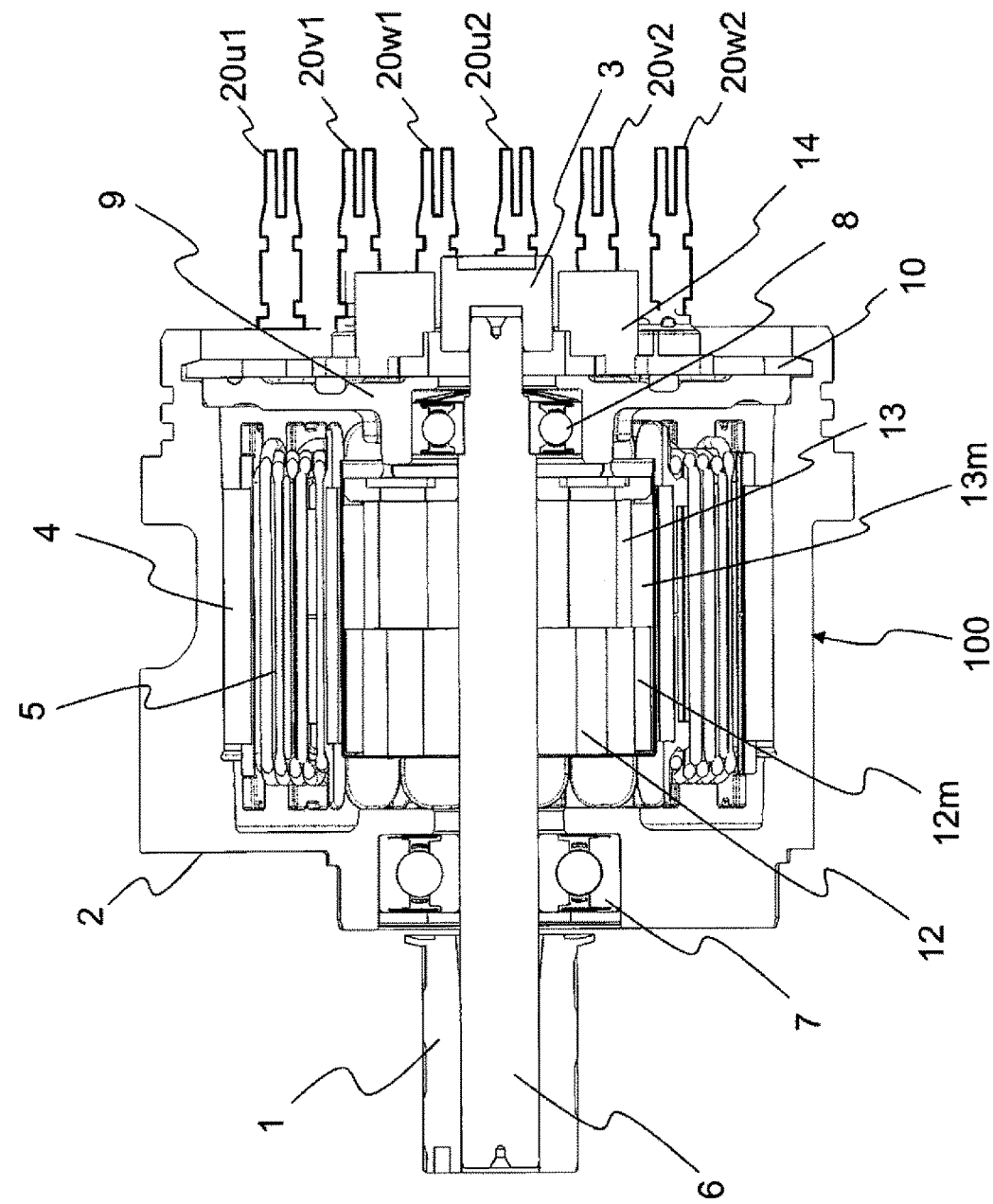
FIG. 2 is a cross-sectional view of a motor 100.

FIG. 1 illustrates an embodiment of a rotating electrical machine according to the present invention. FIG. 1 illustrates a motor part (hereinbelow referred to as a motor 100) of an electric power steering (hereinbelow abbreviated as EPS) motor unit. FIG. 2 is a cross-sectional view of the motor 100. In the EPS motor unit, the motor 100 illustrated in FIG. 1 and a not-illustrated control unit are mechatronically integrated.

In the motor 100, motor components are housed in a housing 2. A driving force of the motor 100 is transmitted via a pulley 1 attached to a shaft 6 serving as a rotating shaft of the motor 100 to a driving unit of a not-illustrated electric power steering system. The shaft 6 is provided with a front rotor core 12 and a rear rotor core 13 serving as rotors. The front rotor core 12 is provided with a front magnet 12m while the rear rotor core 13 is provided with a rear magnet 13m. Outer circumferential portions of the magnets 12m and 13m are covered with a magnet cover.

The shaft 6 is rotatably supported by a front bearing 7 provided on the housing 2 and a rear bearing 8 provided on a bearing case 9 provided on the right end of the housing 2. The bearing case 9 is secured to the housing 2 by a beveled retaining ring 10. A stator coil 5 is wound around a stator core 4 provided at an inner circumferential portion of the housing 2.

The stator coil 5 is constituted by dual three-phase winding groups as described below. Output terminals of the respective three-phase winding groups are electrically connected to terminals (not illustrated) of a bus bar mold 14 secured to the bearing case 9 and are electrically connected via the terminals to two pairs of three-phase terminals (20u1, 20v1, and 20w1) and (20u2, 20v2, and 20w2). One three-phase winding group is connected to the three-phase terminals 20u1, 20v1, and 20w1 while the other three-phase winding group is connected to the three-phase terminals 20u2, 20v2, and 20w2. On the rear side of the shaft, a magnetic pole sensor 3 configured to detect a magnetic pole position of the motor 100 is provided. On the control unit side configured to control driving of the motor 100, a detection circuit is provided to correspond to this magnetic pole sensor 3.

Figure 3:
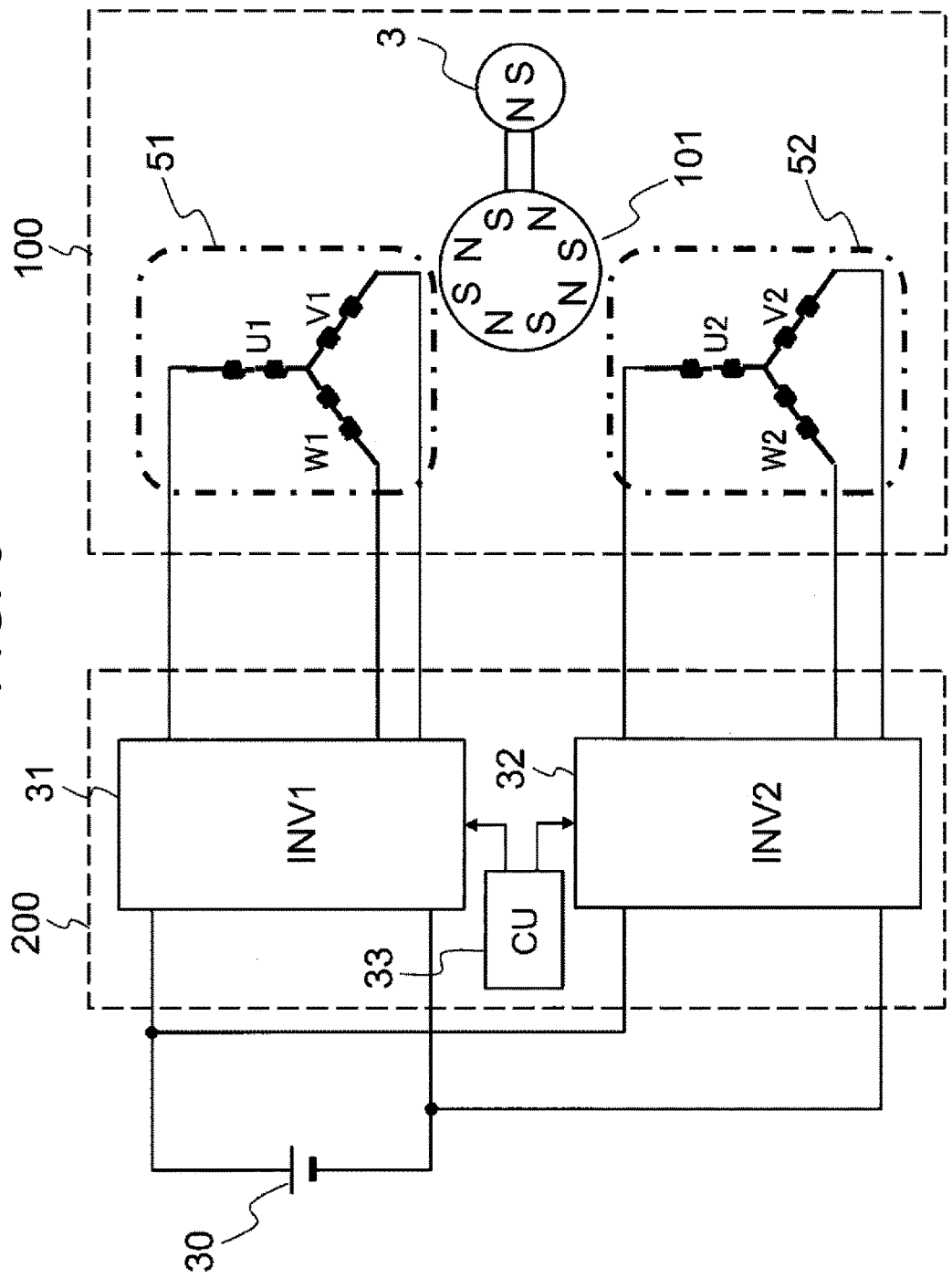
FIG. 3 is a block diagram illustrating an embodiment of a rotating electrical machine system including the motor 100.

FIG. 3 is a block diagram illustrating an embodiment of a rotating electrical machine system including the motor 100. In the example illustrated in FIG. 3, the rotating electrical machine system includes the motor 100 and a driving unit 200 configured to drive the motor 100. As described above, the stator coil 5 of the motor 100 includes the dual three-phase winding groups. Hereinbelow, one three-phase winding group is referred to as a first winding unit 51 while the other three-phase winding group is referred to as a second winding unit 52. The magnetic pole sensor 3 detects a magnetic pole position of a rotor 101. The rotor 101 is constituted by the front rotor core 12, the rear rotor core 13, the front magnet 12m, and the rear magnet 13m illustrated in FIG. 2.

The first winding unit 51 is supplied with current from an inverter 31 while the second winding unit 52 is supplied with current from an inverter 32. In the example illustrated in FIG. 3, although the inverters 31 and 32 are supplied with electricity from a common DC power supply 30, each of the inverters 31 and 32 may be provided with each independent DC power supply. The inverters 31 and 32 supply current to the winding units 51 and 52 based on a driving command from a control unit 33 provided in the driving unit 200.

The control unit 33 calculates target torque of the motor 100 based on detection information input from the magnetic pole sensor 3, a detection value of a torque sensor attached to a steering shaft, and the like. The control unit 33 then controls the inverters 31 and 32 so that a current value of the motor 100 may be a current value corresponding to the target torque.

In the example illustrated in FIG. 3, the three-phase windings of each of the first winding unit 51 and the second winding unit 52 are formed in a Y connection, and each neutral point is electrically insulated. As described above, the first winding unit 51 and the second winding unit 52 are electrically separated and are driven in parallel by the independent inverters 31 and 32, respectively. For example, in a case where a U-phase winding U1 of the first winding unit 51 and a U-phase winding U2 of the second winding unit 52 have no electrical phase difference, U-phase current of the inverter 31 and U-phase current of the inverter 32 are in the same phase. However, depending on the slot combination, the U-phase windings have an electrical phase difference in some cases. In this case, each inverter needs to supply current to correspond to a phase of induced voltage of each of the winding units 51 and 52.

Figure 4:
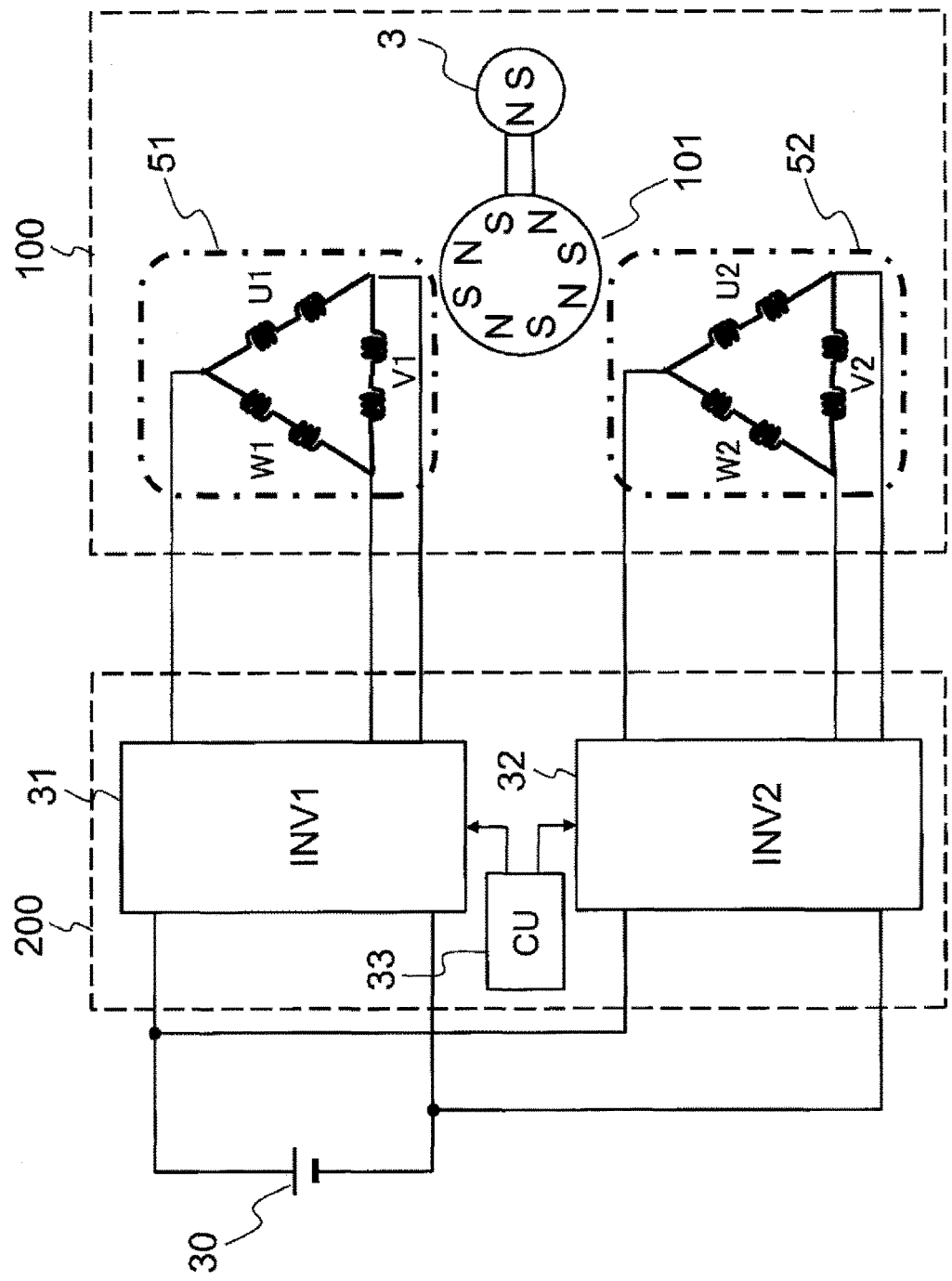
FIG. 4 illustrates a case where each of a first winding unit 51 and a second winding unit 52 is formed in a delta connection.

FIG. 4 illustrates a case where each of the first winding unit 51 and the second winding unit 52 illustrated in FIG. 3 is formed in a delta connection. In this case as well as the aforementioned case of the Y connection, current to be supplied to each of the first winding unit 51 and the second winding unit 52 needs to be one to correspond to a phase of the induced voltage. The phase of the inverter current is determined based on a signal of the magnetic pole sensor 3.

In the present embodiment, each of the first winding unit 51 and the second winding unit 52 has a concentrated winding configuration. In the concentrated winding configuration, a coil is annularly wound around each tooth, and arrangement of phases changes depending on the combination of the number of poles with the number of slots (equal to the number of teeth).

FIG. 6 illustrates combinations for the concentrated winding configuration that can be achieved by the dual winding arrangement. The number of poles that can be used in the motor 100 for the EPS is determined based on the PWM frequency of each of the inverters 31 and 32 and the maximum number of times of rotation of the motor 100, and the maximum number of poles seems to be approximately 16. Accordingly, the selectable number of teeth (the number of slots) is up to 18. Also, in FIG. 6, the number of teeth that can be achieved by the dual winding arrangement is an integral multiple of 6. The present embodiment provides a winding connection structure that can restrict torque ripple even in a case where the motor is driven only by one of the dual winding units, and examples thereof are shown in FIGS. 9 to 17. As a comparative example, a configuration that can relatively increase torque ripple is shown in FIG. 8.

Figure 7:
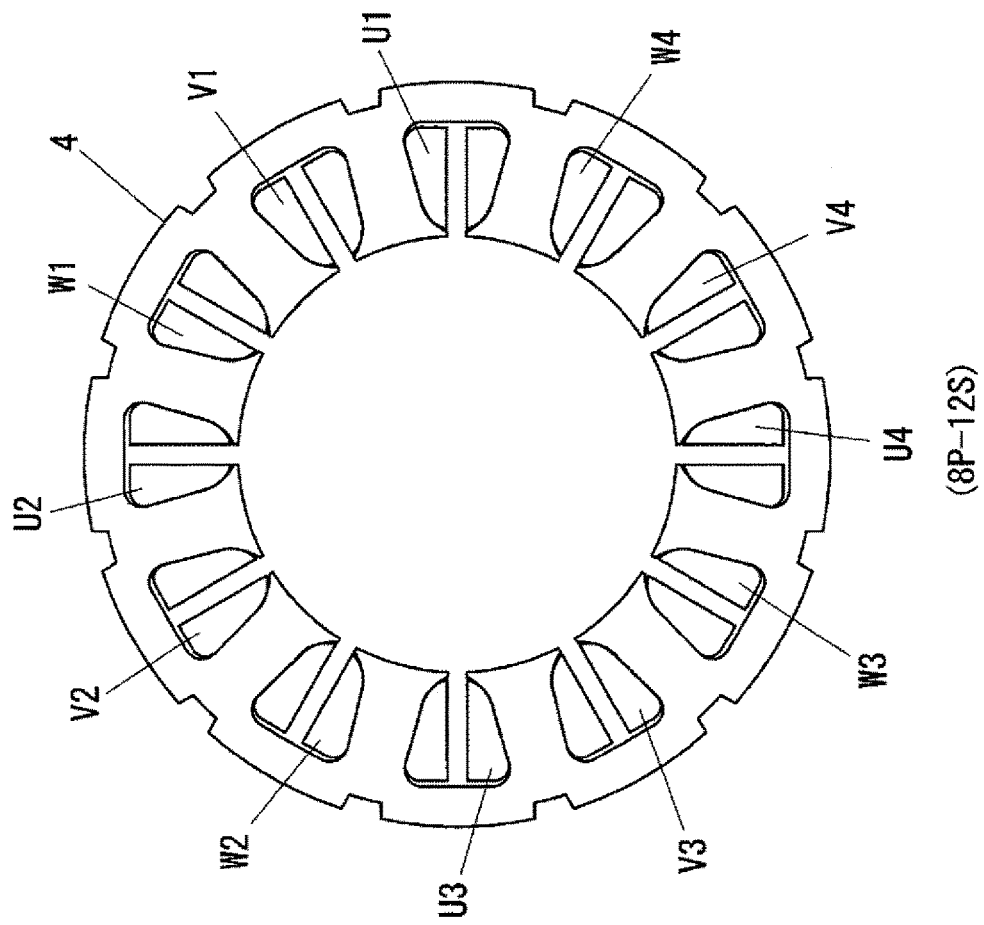
FIG. 7 illustrates arrangement of stator windings of the motor 100 including 8 poles and 12 slots.

FIG. 7 illustrates arrangement of stator windings of the motor 100 including 8 poles and 12 slots in combinations illustrated in FIG. 6. The number of teeth is 12, which is equal to the number of slots. Since the 8-pole 12-slot configuration includes windings with a 2-to-3 type, the phase difference per tooth is 120 degrees in terms of electrical angle. For this reason, the configuration includes three-phase windings with the U phase, the V phase, and the W phase repeated four times and includes four windings for each phase. Thus, in a case where the dual winding arrangement is provided, each phase is constituted by two windings. The concentrated phase windings wound around the respective teeth are arranged anticlockwise in order of a U1 phase, a V1 phase, a W1 phase, a U2 phase, a V2 phase, a W2 phase, a U3 phase, a V3 phase, a W3 phase, a U4 phase, a V4 phase, and a W4 phase as illustrated in FIG. 7.

Figure 8A:
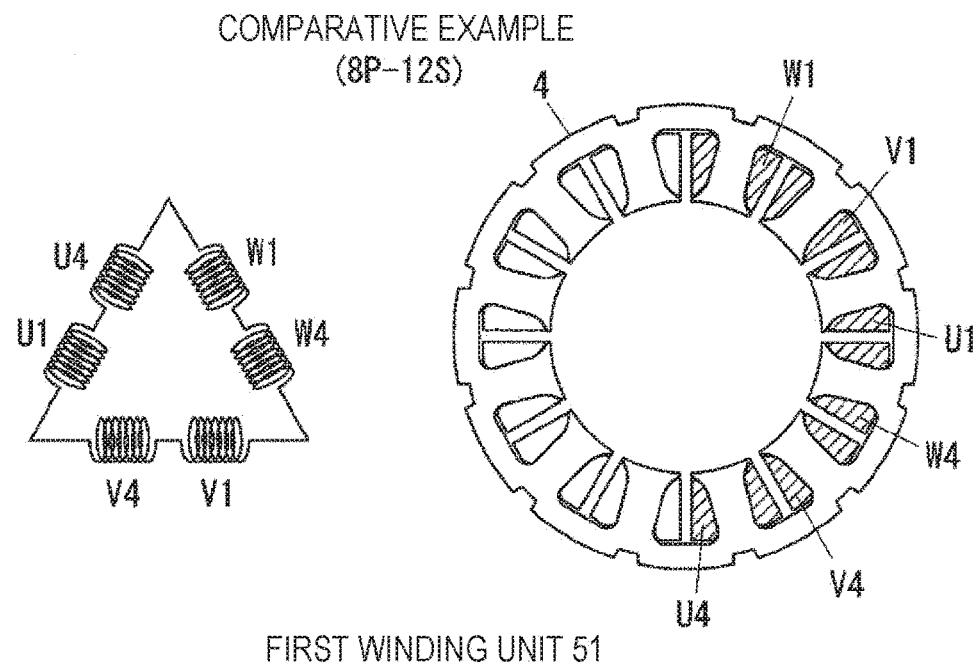
FIGS. 8A and 8B illustrate a comparative example of the 8-pole 12-slot case.
Figure 8B:
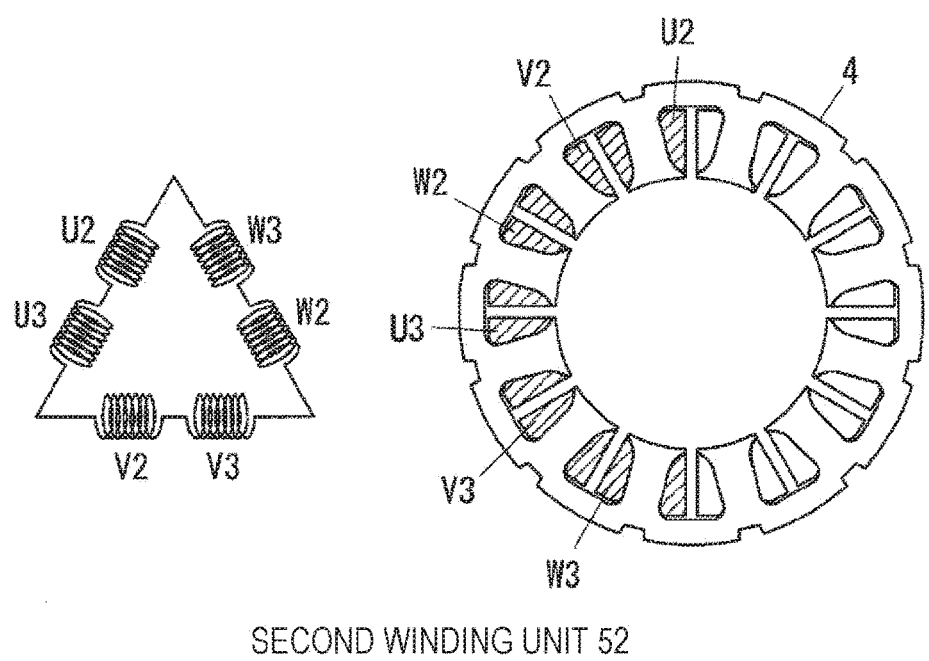

FIG. 8 illustrates a comparative example of the 8-pole 12-slot case and illustrates a case where dual winding groups (the first winding unit 51 and the second winding unit 52) are arranged separately on the right and left sides of the motor 100. FIG. 8(a) illustrates a delta connection (left side) and arrangement of windings (right side) of the first winding unit 51. FIG. 8(b) illustrates those of the second winding unit 52.

In a case where the dual winding units 51 and 52 are supplied with equal current and are operated by the two inverters 31 and 32, the values of the flowing current are equal regardless of how the windings in the dual winding units are connected, and the motor characteristics do not change.

However, in a case where only one of the winding units is driven by only one of the inverters, in the configuration illustrated in FIG. 8, the magnetic circuit of the motor 100 exists on one side, and the magnetic flux density fluctuates. Thus, the magnetic fluctuation at the boundary between the first winding unit 51 and the second winding unit 52 differs form that at the center part. Consequently, as in FIG. 8, in a case where the two winding units 51 and 52 are arranged separately on the right and left sides, a magnetic imbalance will occur, which will increase torque ripple.

As described below, the present embodiment is characterized in that the three-phase winding group of the first winding unit 51 is symmetrical with that of the second winding unit 52. With such winding arrangement, torque ripple is decreased even in one-side electrical current supply. The three-phase windings of the first winding unit 51 are arranged to have a 120-degree phase difference in terms of mechanical angle. Also, the three-phase windings of the second winding unit 52 are arranged to have a 60-degree phase difference in terms of mechanical angle with respect to the first winding unit 51. As a result, symmetry between the respective winding units is maintained. Hereinbelow, specific arrangement of phase windings will be described.

Figure 9A:
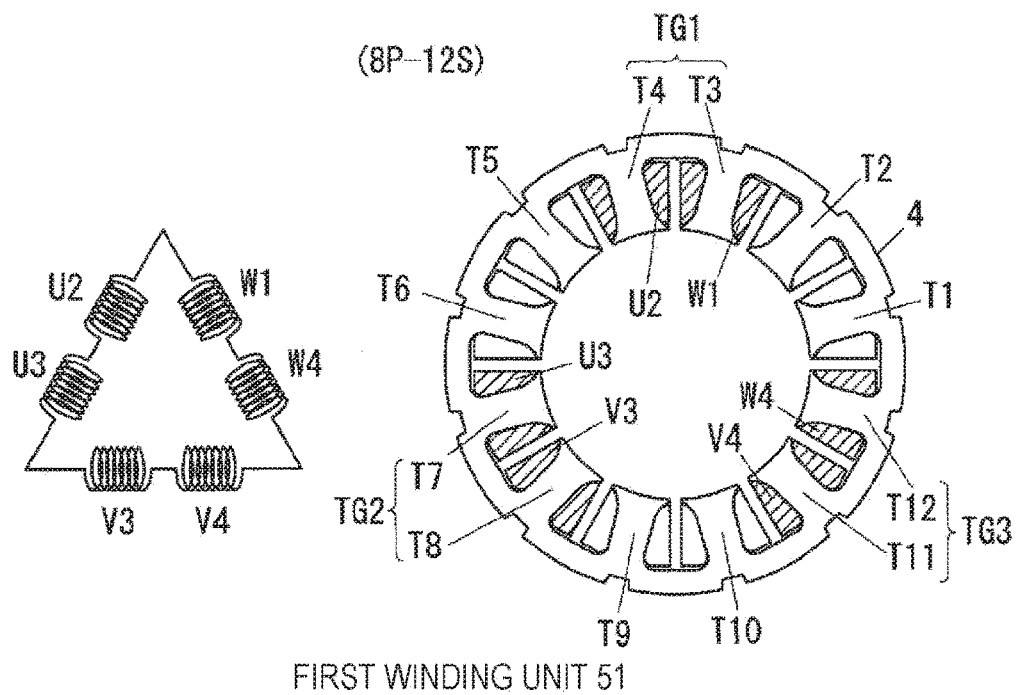
FIGS. 9A and 9B illustrate configurations of the first and second winding units and delta connections in a case of the 8-pole 12-slot configuration.
Figure 9B:
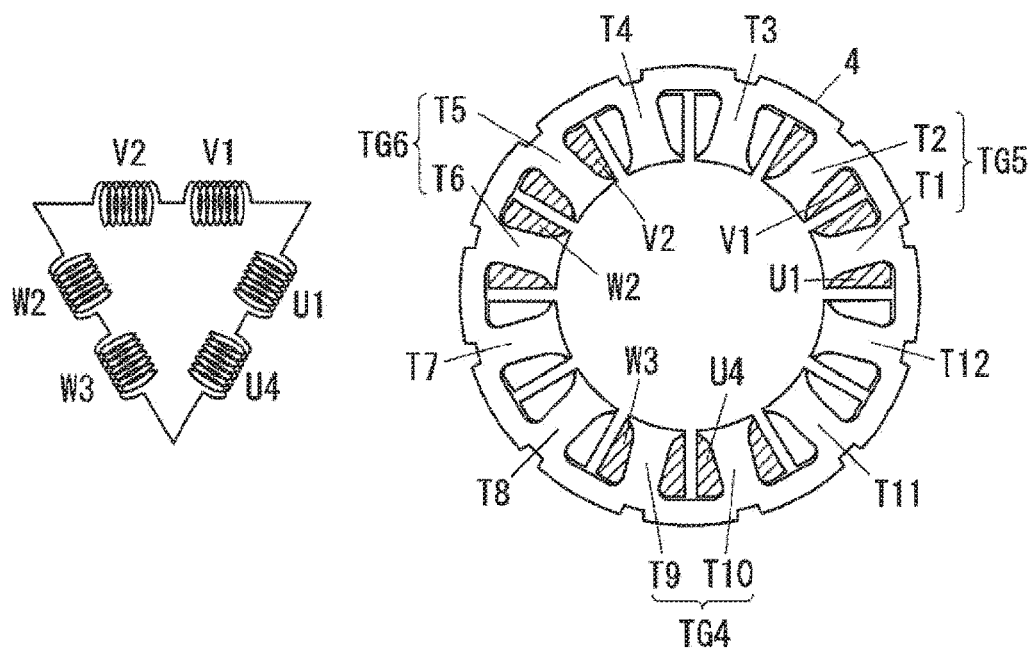

FIG. 9 illustrates winding arrangement of the first winding unit 51 and the second winding unit 52 and delta connections in a case of an 8-pole 12-slot configuration. Meanwhile, winding arrangement in a case of a 16-pole 12-slot configuration in which the slot combination is a 4-to-3 type is equal to that in the case illustrated in FIG. 9 although description thereof is omitted. In this case, a similar effect can be obtained to that in the case of the 8-pole 12-slot configuration in FIG. 9.

The first winding unit 51 includes six phase windings, that is, a U2-phase winding, a U3-phase winding, a V3-phase winding, a V4-phase winding, a W1-phase winding, and a W4-phase winding. Six teeth, that is, T4, T7, T8, T11, T3, and T12, around which these phase windings are wound, are divided into three teeth groups TG1, TG2, and TG3 each including two adjacent teeth. As is apparent from FIG. 9(a), the teeth groups TG1, TG2, and TG3 are provided at 120-degree pitches in terms of mechanical angle. In the delta connection of the first winding unit 51, the U2-phase winding and the W1-phase winding are arranged to be adjacent to each other at the top, and the W4-phase winding and the V4-phase winding are arranged to be adjacent to each other on the right side. Also, the U3-phase winding and the V3-phase winding are arranged to be adjacent to each other on the left side. The windings in the same phase are connected in series, and the three-phase windings are combined, to form a delta connection.

Also, a U1-phase winding, a U4-phase winding, a V1-phase winding, a V2-phase winding, a W2-phase winding, and a W3-phase winding constituting the second winding unit 52 are wound around the remaining teeth T1, T10, T2, T5, T6, and T9. These teeth form other teeth groups TG4, TG5, and TG6 each including two adjacent teeth. These teeth groups TG4, TG5, and TG6 are provided at 120-degree pitches in terms of mechanical angle. That is, the phase windings of the second winding unit 52 are arranged to have a 60-degree phase difference in terms of mechanical angle with respect to the phase windings of the first winding unit 51.

In the winding arrangement illustrated in FIG. 9, each of the first winding unit 51 and the second winding unit 52 has a cyclic winding layout. In this manner, since each of the winding units can have a cyclic winding layout, generation of torque ripple can be decreased even in a driving state in which only one winding unit is supplied with current.

Figure 10:
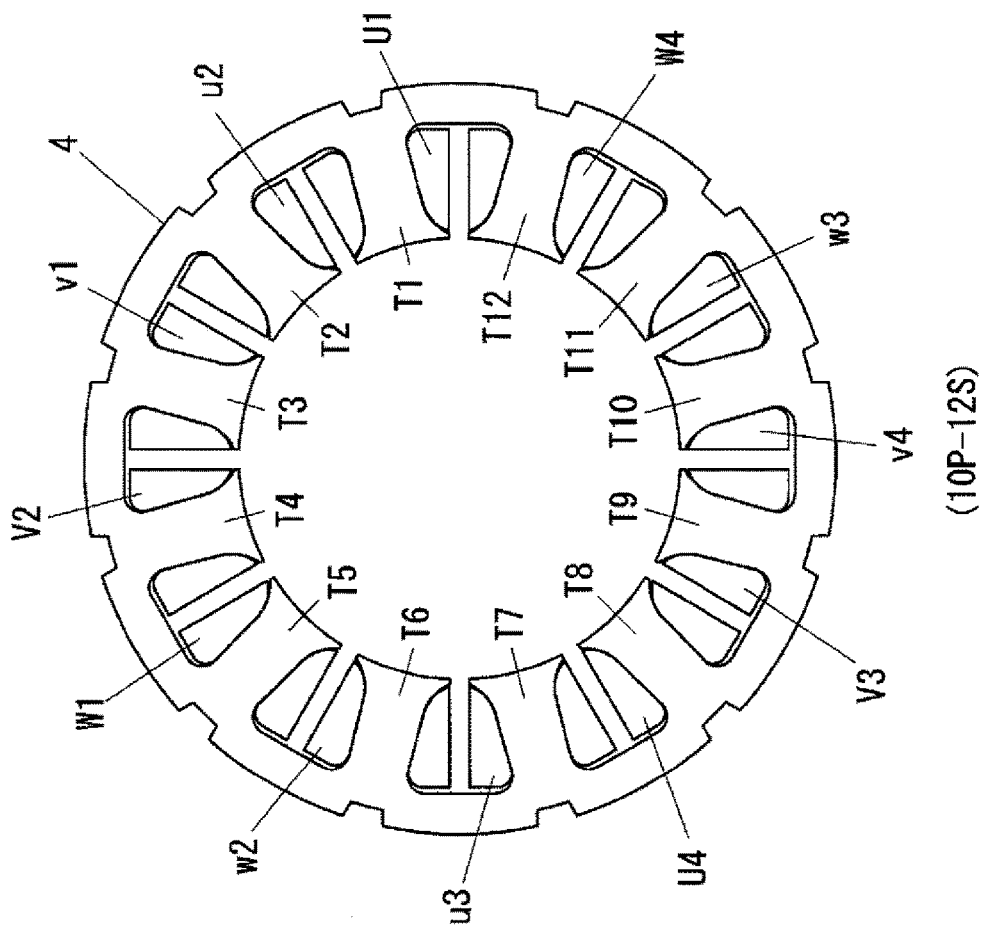
FIG. 10 illustrates winding arrangement in a case of a 10-pole 12-slot configuration.

FIG. 10 illustrates winding arrangement in a case of a 10-pole 12-slot configuration. Meanwhile, winding arrangement on the stator side in a case of a 14-pole 12-slot configuration is equal to that in the case of the 10-pole 12-slot configuration. The number of teeth is 12, which is equal to the number of slots. A U1-phase winding, a u2-phase winding, a v1-phase winding, a V2-phase winding, a W1-phase winding, a w2-phase winding, a u3-phase winding, a U4-phase winding, a V3-phase winding, a v4-phase winding, a w3-phase winding, and a W4-phase winding are wound around teeth T1 to T12 and are arranged in this order anticlockwise. Meanwhile, for the u2, v1, w2, u3, v4, and w3-phase windings, concentrated windings wound in a reverse direction of the U1, V2, W1, U4, V3, and W4-phase windings are used.

Figure 11A:
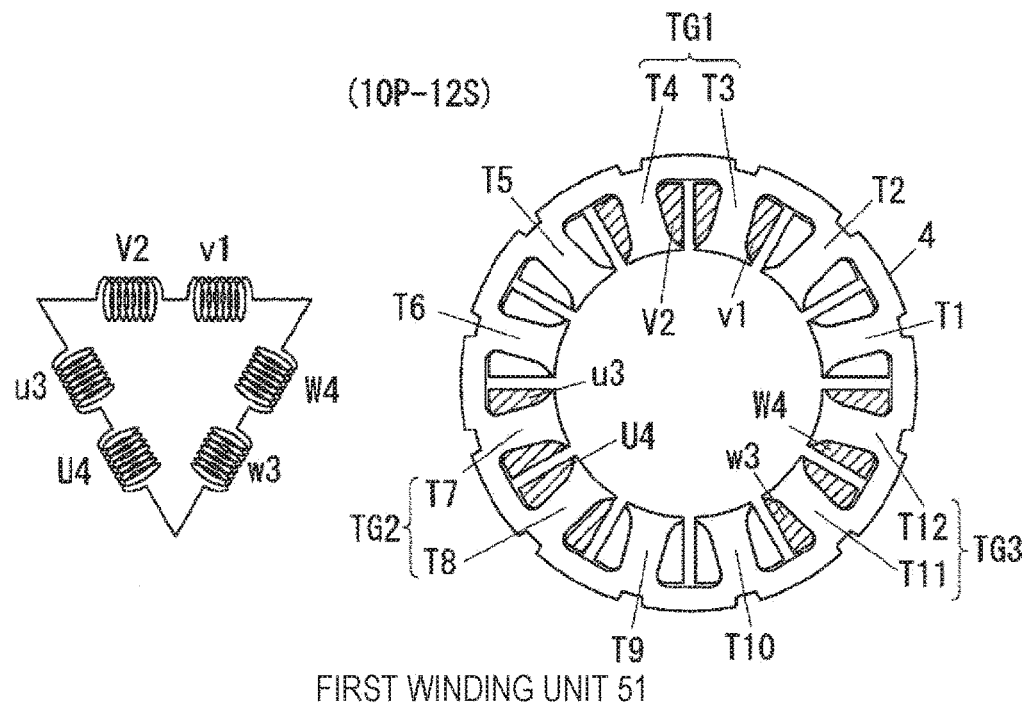
FIGS. 11A and 11B illustrate configurations of the first and second winding units and delta connections in a case of the 10-pole 12-slot configuration.

FIG. 11 illustrates configurations of the first winding unit 51 and the second winding unit 52 and delta connections in the case of the 10-pole 12-slot configuration. In the first winding unit 51 illustrated in FIG. 11(a), the v1-phase winding and the V2-phase winding are wound around the teeth T3 and T4 in a teeth group TG1, the u3-phase winding and the U4-phase winding are wound around the teeth T7 and T8 in a teeth group TG2, and the w3-phase winding and the W4-phase winding are wound around the teeth T11 and T12 in a teeth group TG3. In the delta connection, the windings in the same phase are connected in series in a manner of v1-V2, u3-U4, and u3-U4, and the three-phase windings are combined, to form the delta connection.

Figure 11B:
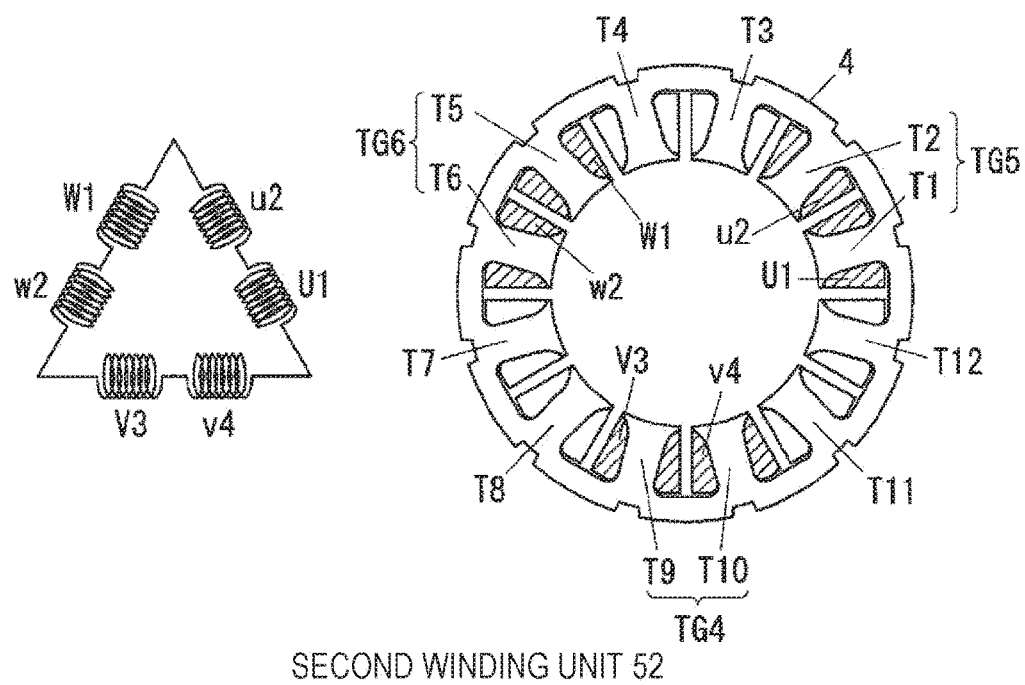

On the other hand, in the second winding unit 52 illustrated in FIG. 11(b), the V3-phase winding and the v4-phase winding are wound around the teeth T9 and T10 in a teeth group TG4, the U1-phase winding and the u2-phase winding are wound around the teeth T1 and T2 in a teeth group TG5, and the W1-phase winding and the w2-phase winding are wound around the teeth T5 and T6 in a teeth group TG6. In the delta connection, the windings in the same phase are connected in series in a manner of U1-u2, V3-v4, and W1-w2, and the three-phase windings are combined, to form the delta connection.

Figure 12:
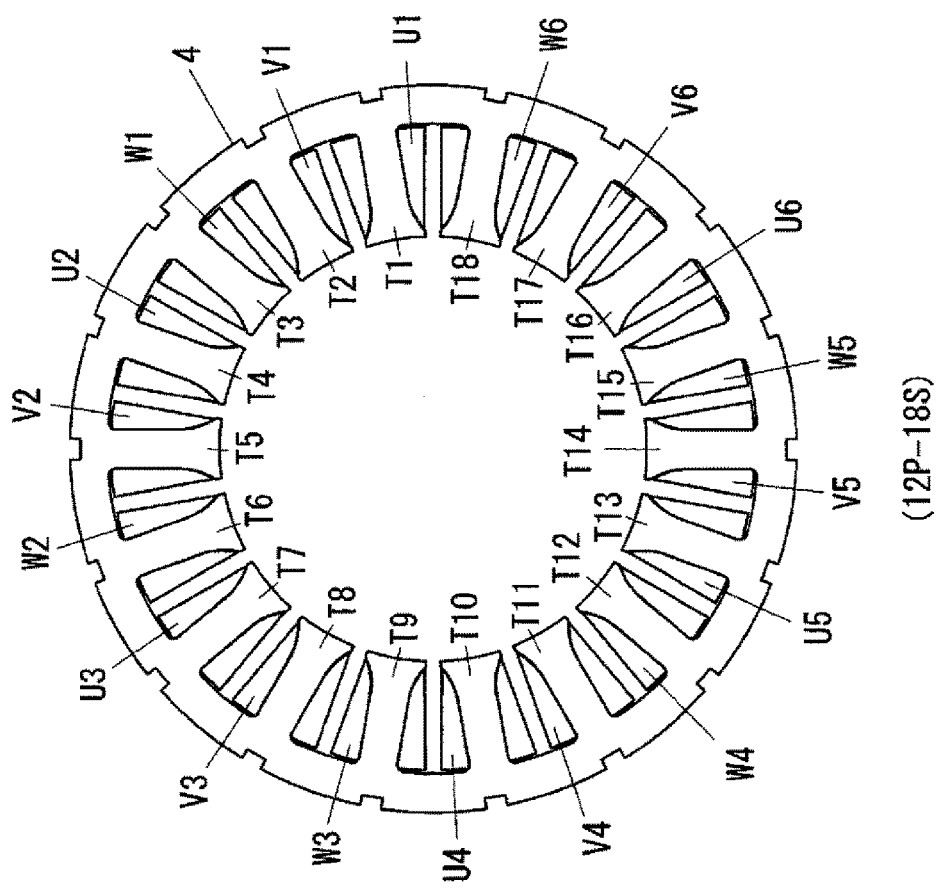
FIG. 12 illustrates winding arrangement in a case of a 12-pole 18-slot configuration.

FIG. 12 illustrates winding arrangement in a case of a 12-pole 18-slot configuration. Meanwhile, winding arrangement on the stator side in a case of a 24-pole 18-slot configuration is equal to that in the case of the 12-pole 18-slot configuration. The number of teeth is 18, which is equal to the number of slots. A U1-phase winding, a V1-phase winding, a W1-phase winding, a U2-phase winding, a V2-phase winding, a W2-phase winding, a U3-phase winding, a V3-phase winding, a W3-phase winding, a U4-phase winding, a V4-phase winding, a W4-phase winding, a U5-phase winding, a V5-phase winding, a W5-phase winding, a U6-phase winding, a V6-phase winding, and a W6-phase winding are wound around teeth T1 to T18 and are arranged in this order anticlockwise.

Figure 13A:
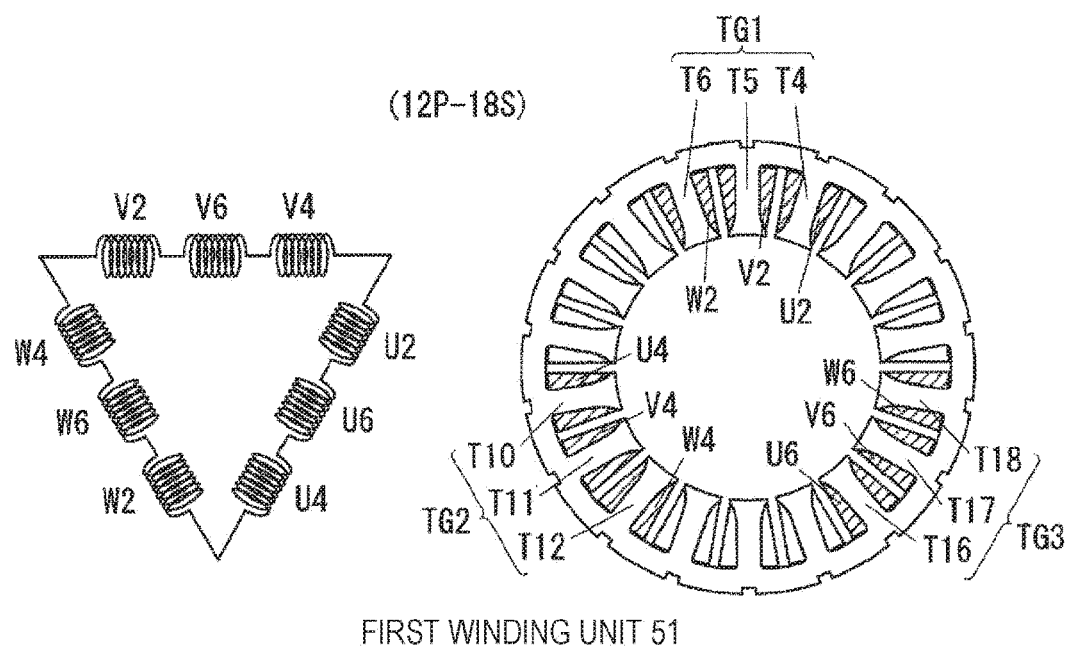
FIGS. 13A and 13B illustrate configurations of the first and second winding units and delta connections in a case of the 12-pole 18-slot configuration.

FIG. 13 illustrates configurations of the first winding unit 51 and the second winding unit 52 and delta connections in the case of the 12-pole 18-slot configuration. In the first winding unit 51 illustrated in FIG. 13(a), the U2-phase winding, the V2-phase winding, and the W2-phase winding are wound around the teeth T4, T5, and T6 in a teeth group TG1, the U4-phase winding, the V4-phase winding, and the W4-phase winding are wound around the teeth T10, T11, and T12 in a teeth group TG2, and the U6-phase winding, the V6-phase winding, and the W6-phase winding are wound around teeth T16, T17, and T18 in a teeth group TG3. In the delta connection, the windings in the same phase are connected in series in a manner of V2-V6-V4, W2-W6-W4, and U2-U6-U4, and the three-phase windings are combined, to form the delta connection.

Figure 13B:
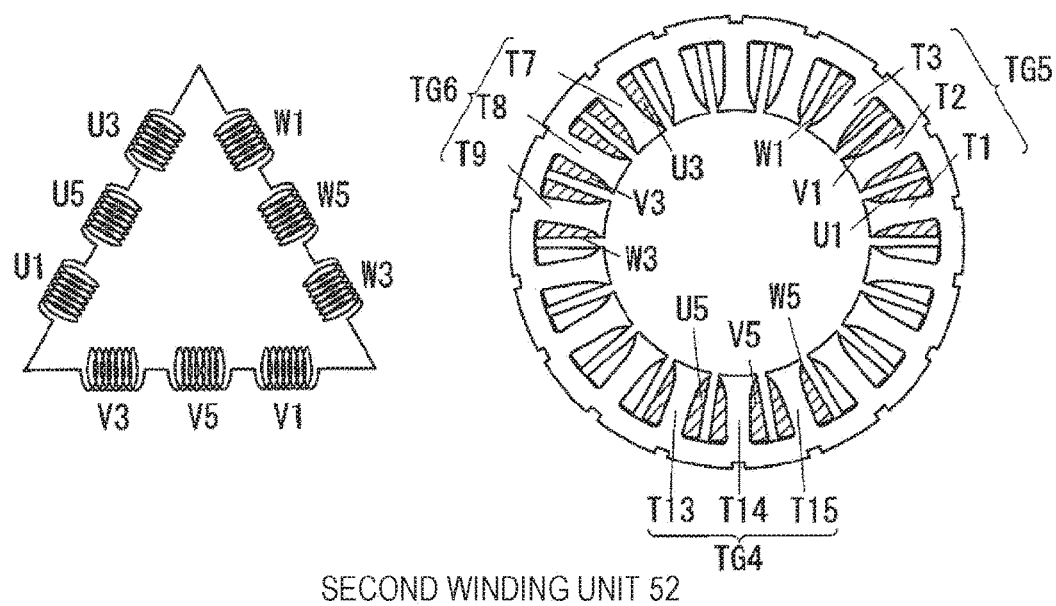

On the other hand, in the second winding unit 52 illustrated in FIG. 13(b), the U5-phase winding, the V5-phase winding, and the W5-phase winding are wound around the teeth T13, T14, and T15 in a teeth group TG4, the U1-phase winding, the V1-phase winding, and the W1-phase winding are wound around the teeth T1, T2, and T3 in a teeth group TG5, and the U3-phase winding, the V3-phase winding, and the W3-phase winding are wound around the teeth T7, T8, and T9 in a teeth group TG6. In the delta connection, the windings in the same phase are connected in series in a manner of U1-U5-U3, V1-V5-V3, and W1-W5-W3, and the three-phase windings are combined, to form the delta connection. In this manner, in a case where the number of teeth is 18, three teeth are included in each teeth group, and in the delta connection, the three windings in the same phase are connected in series.

Figure 14:
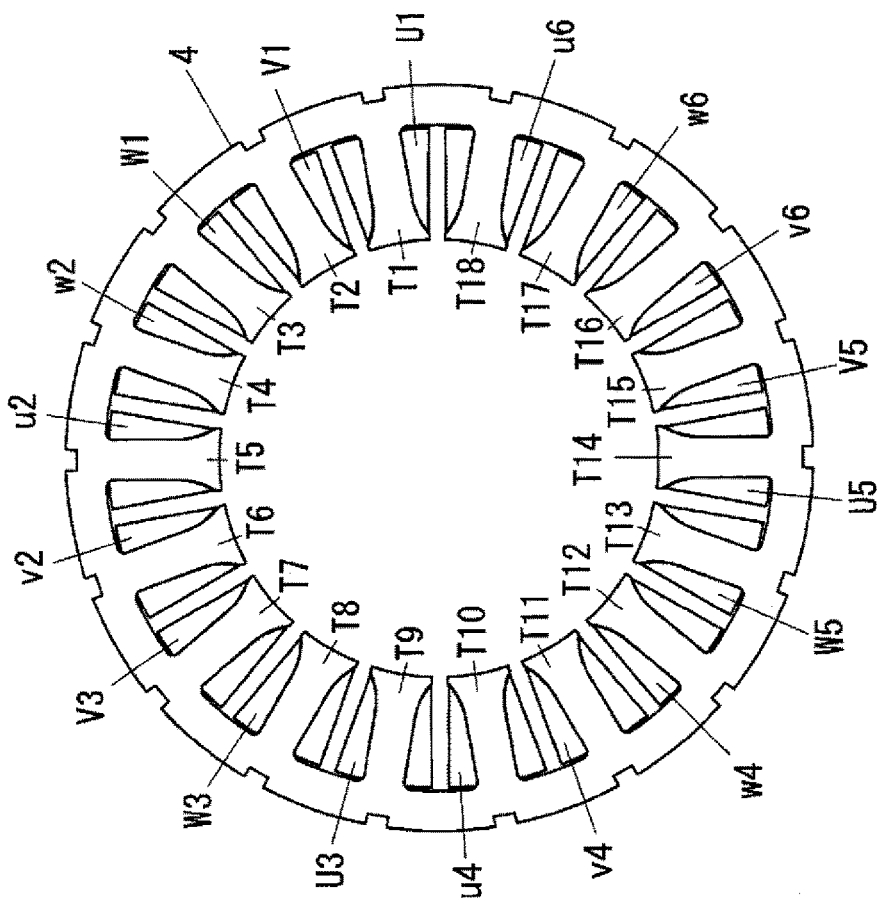
FIG. 14 illustrates winding arrangement in a case of a 14-pole 18-slot configuration.

FIG. 14 illustrates winding arrangement in a case of a 14-pole 18-slot configuration. The number of teeth is 18, which is equal to the number of slots. A U1-phase winding, a V1-phase winding, a W1-phase winding, a w2-phase winding, a u2-phase winding, a v2-phase winding, a V3-phase winding, a W3-phase winding, a U3-phase winding, a u4-phase winding, a v4-phase winding, a w4-phase winding, a W5-phase winding, a U5-phase winding, a V5-phase winding, a v6-phase winding, a w6-phase winding, and a u6-phase winding are wound around teeth T1 to T18 and are arranged in this order anticlockwise.

Figure 15A:
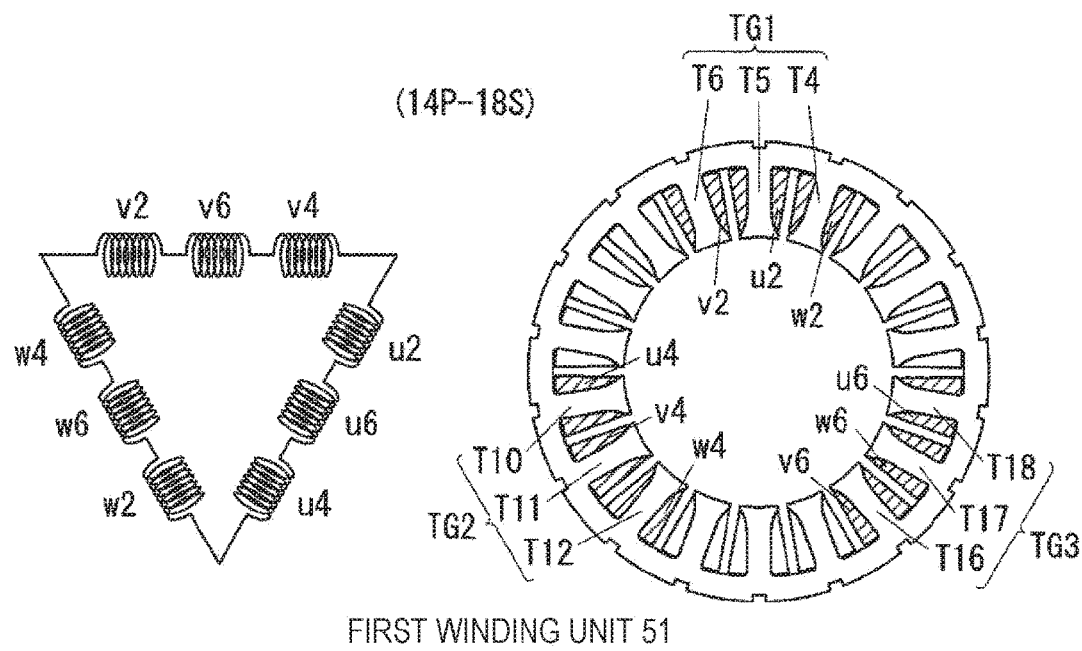
FIGS. 15A and 15B illustrate configurations of the first and second winding units and delta connections in a case of the 14-pole 18-slot configuration.

FIG. 15 illustrates configurations of the first winding unit 51 and the second winding unit 52 and delta connections in the case of the 14-pole 18-slot configuration. In the first winding unit 51 illustrated in FIG. 15(a), the w2-phase winding, the u2-phase winding, and the v2-phase winding are wound around the teeth T4, T5, and T6 in a teeth group TG1, the u4-phase winding, the v4-phase winding, and the w4-phase winding are wound around the teeth T10, T11, and T12 in a teeth group TG2, and the v6-phase winding, the w6-phase winding, and the u6-phase winding are wound around teeth T16, T17, and T18 in a teeth group TG3. In the delta connection, the windings in the same phase are connected in series in a manner of v2-v6-v4, w2-w6-w4, and u2-u6-u4, and the three-phase windings are combined, to form the delta connection.

Figure 15B:
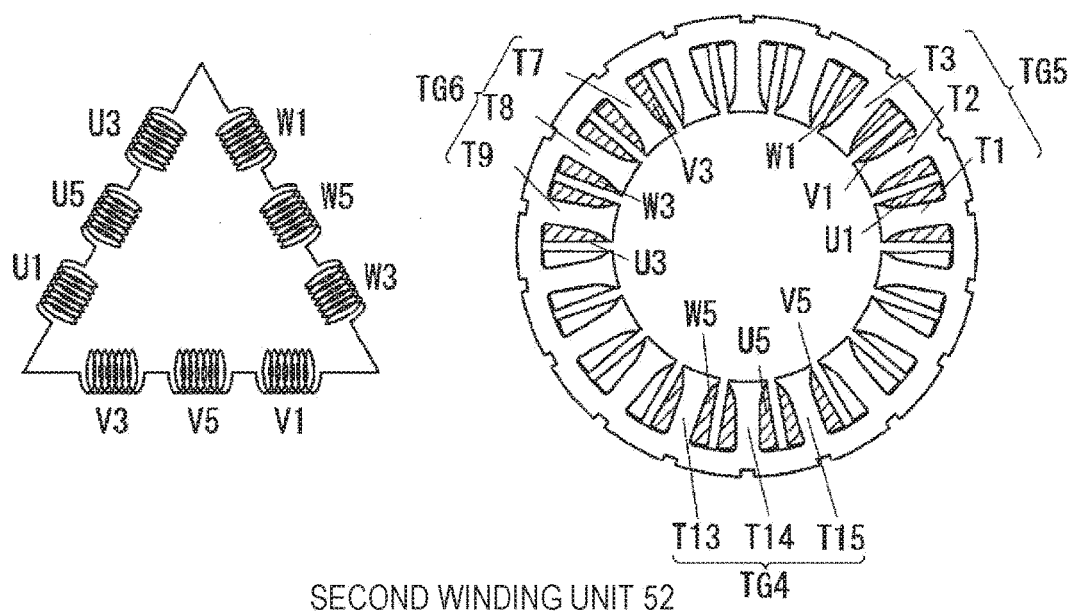

On the other hand, in the second winding unit 52 illustrated in FIG. 15(b), the W5-phase winding, the U5-phase winding, and the V5-phase winding are wound around the teeth T13, T14, and T15 in a teeth group TG4, the U1-phase winding, the V1-phase winding, and the W1-phase winding are wound around the teeth T1, T2, and T3 in a teeth group TG5, and the V3-phase winding, the W3-phase winding, and the U3-phase winding are wound around the teeth T7, T8, and T9 in a teeth group TG6. In the delta connection, the windings in the same phase are connected in series in a manner of U1-U5-U3, V1-V5-V3, and W1-W5-W3, and the three-phase windings are combined, to form the delta connection.

Figure 16:
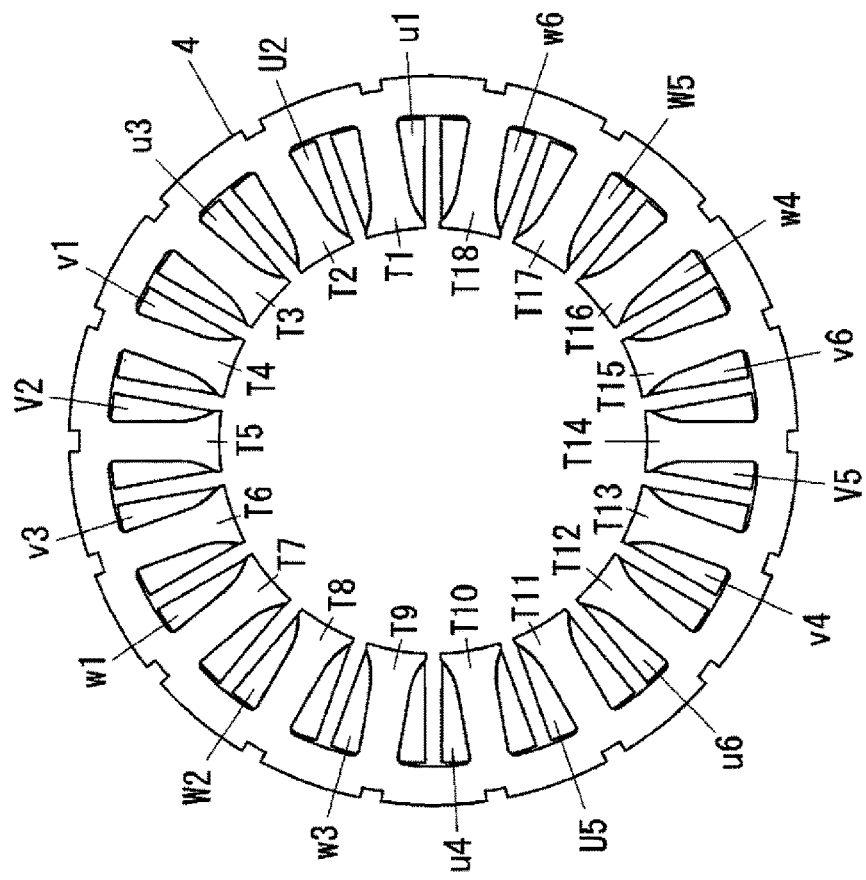
FIG. 16 illustrates winding arrangement in a case of a 16-pole 18-slot configuration.

FIG. 16 illustrates winding arrangement in a case of a 16-pole 18-slot configuration. The number of teeth is 18, which is equal to the number of slots. A u1-phase winding, a U2-phase winding, a u3-phase winding, a v1-phase winding, a V2-phase winding, a v3-phase winding, a w1-phase winding, a W2-phase winding, a w3-phase winding, a u4-phase winding, a U5-phase winding, a u6-phase winding, a v4-phase winding, a V5-phase winding, a v6-phase winding, a w4-phase winding, a W5-phase winding, and a w6-phase winding are wound around teeth T1 to T18 and are arranged in this order anticlockwise.

Figure 17A:
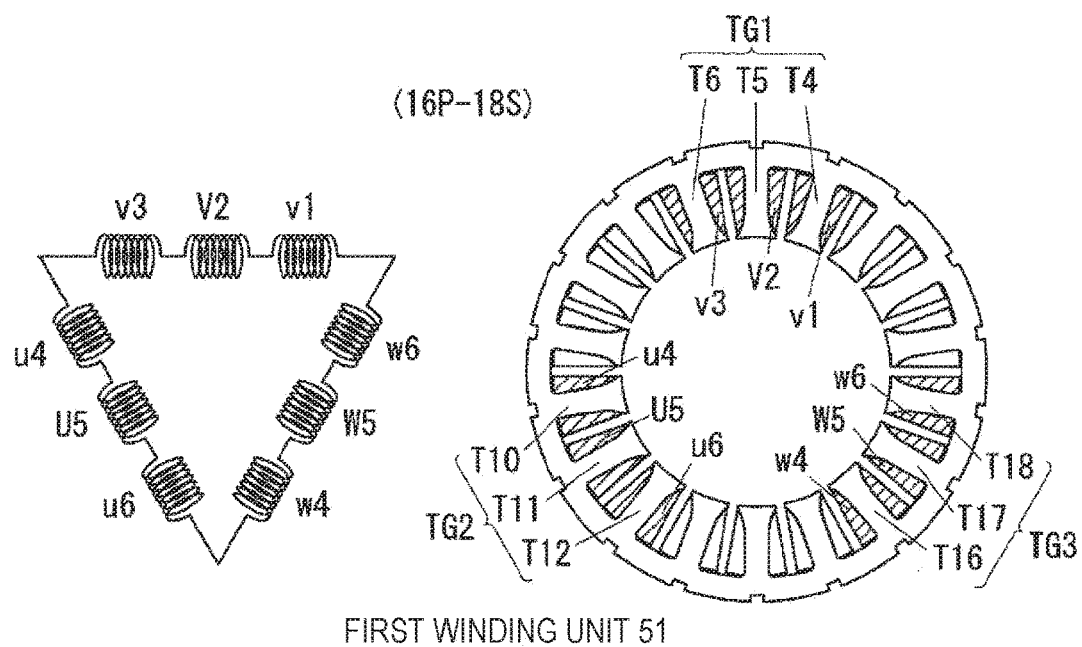
FIGS. 17A and 17B illustrate configurations of the first and second winding units and delta connections in a case of the 16-pole 18-slot configuration.

FIG. 17 illustrates configurations of the first winding unit 51 and the second winding unit 52 and delta connections in the case of the 16-pole 18-slot configuration. In the first winding unit 51 illustrated in FIG. 17(a), the v1-phase winding, the V2-phase winding, and the v3-phase winding are wound around the teeth T4, T5, and T6 in a teeth group TG1, the u4-phase winding, the U5-phase winding, and the u6-phase winding are wound around the teeth T10, T11, and T12 in a teeth group TG2, and the w4-phase winding, the W5-phase winding, and the w6-phase winding are wound around teeth T16, T17, and T18 in a teeth group TG3. In the delta connection, the windings in the same phase are connected in series in a manner of u4-U5-u6, v1-V2-v3, and w4-W5-w6, and the three-phase windings are combined, to form the delta connection.

Figure 17B:
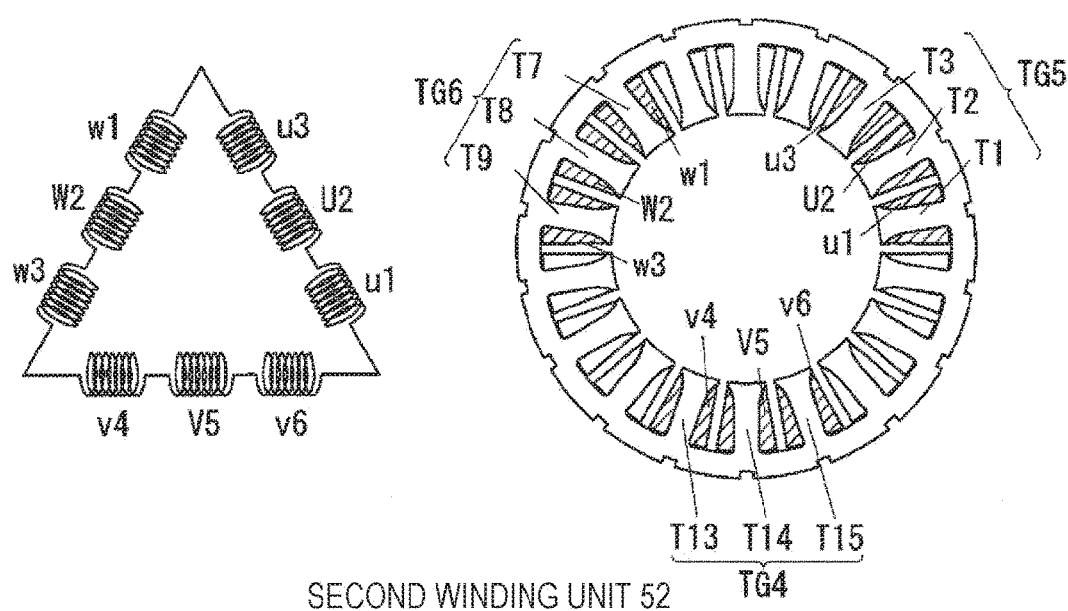

On the other hand, in the second winding unit 52 illustrated in FIG. 17(b), the v4-phase winding, the V5-phase winding, and the v6-phase winding are wound around the teeth T13, T14, and T15 in a teeth group TG4, the u1-phase winding, the U2-phase winding, and the u3-phase winding are wound around the teeth T1, T2, and T3 in a teeth group TG5, and the w1-phase winding, the W2-phase winding, and the w3-phase winding are wound around the teeth T7, T8, and T9 in a teeth group TG6. In the delta connection, the windings in the same phase are connected in series in a manner of u1-U2-u3, v4-V5-v6, and w1-W2-w3, and the three-phase windings are combined, to form the delta connection.

As described above, in the motor 100 serving as a rotating electrical machine including the stator coil 5 constituted by concentrated windings arranged to the 6N teeth where an integer N≥2, the stator coil 5 includes the first winding unit 51 and the second winding unit 52 each of which is constituted by 3N windings and which are independent from each other, the 3N windings constituting the first winding unit 51 are arranged in three teeth groups TG1, TG2, and TG3 each of which includes N adjacent teeth and which are provided at 120-degree pitches in terms of mechanical angle, and the 3N windings constituting the second winding unit 52 are arranged in teeth which are the 6N teeth not included in the three teeth groups TG1, TG2, and TG3. That is, the 3N windings constituting the second winding unit 52 are arranged in three teeth groups TG4, TG5, and TG6 which are provided at 120-degree pitches in terms of mechanical angle.

In this manner, in the present embodiment, the two winding units 51 and 52 of the motor 100 are arranged to be magnetically balanced. Thus, in a case where, in the configuration in which the respective winding units 51 and 52 are driven by the inverters 31 and 32 independently as illustrated in FIG. 4, one of the inverters 31 and 32 is failed, which causes one-side electrical current supply, torque ripple can be decreased. Meanwhile, since a part at which the two winding units 51 and 52 contact each other is provided with a space or an insulating material to enable a short circuit between the units to be prevented, the failure rate of the motor 100 can be lowered. Also, a crossover wire of a winding with one phase crossing over a winding with another phase is provided with an insulating tape or an insulating tube to enable the motor 100 to be more reliable. It is to be noted that, although the configuration including the delta connection has been described in FIGS. 9 to 17, a configuration including the Y connection has the same effect of decreasing torque ripple.

Second Embodiment

Figure 5:
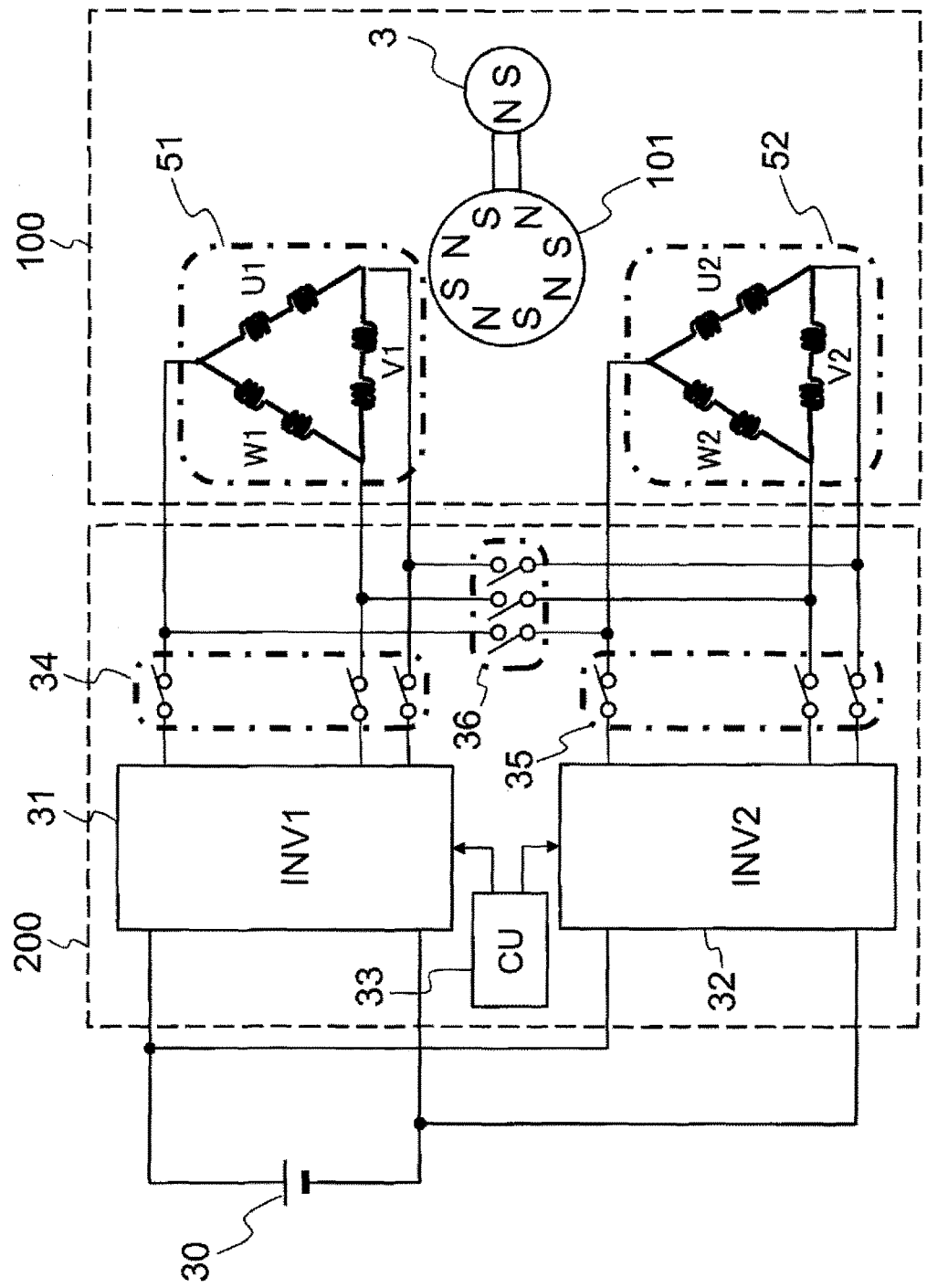
FIG. 5 illustrates a rotating electrical machine system according to a second embodiment.

FIG. 5 illustrates another embodiment of the rotating electrical machine system illustrated in FIG. 4. The rotating electrical machine system illustrated in FIG. 5 includes a switch 34 which can interrupt electrical connection between the inverter 31 and the first winding unit 51, a switch 35 which can interrupt electrical connection between the inverter 32 and the second winding unit 52, and a switch 36 which can electrically connect the first winding unit 51 to the second winding unit 52. Opening/closing control of the switches 34 to 36 is performed by the control unit 33.

At the time of normal control, the switches 34 and 35 are in closed states (connection states) while the switch 36 is in an opened state (interruption state). That is, in a similar manner to that in FIG. 4, the first winding unit 51 is driven by the inverter 31 while the second winding unit 52 is driven by the inverter 32, and the two winding units 51 and 52 are electrically independent from each other. In this case, since the number of windings arranged in series or in parallel and the number of times of winding are equal in the first winding unit 51 and the second winding unit 52 so that the first winding unit 51 and the second winding unit 52 may have totally equal characteristics, torque generated when the first winding unit 51 and the second winding unit 52 are driven with equal current is equal in the first winding unit 51 and the second winding unit 52.

However, in a case where there is a phase difference between induced voltage of the first winding unit 51 and induced voltage of the second winding unit 52, a phase difference of torque ripple is generated. Thus, depending on the phase difference, the torque ripple may be able to be decreased. The cycle of torque ripple of a three-phase motor normally corresponds to a 60-degree phase in terms of electrical angle. Accordingly, in a case where the phase difference of the induced voltage is about 30 degrees in terms of electrical angle, torque ripple generated in the two winding units can be cancelled out.

On the other hand, in a case where the inverter 31 is failed, for example, the inverter 31 is turned off, and the switch 36 is switched to a closed state (connection state), to bring the first winding unit 51 and the second winding unit 52 in a parallel connection state. As a result, the first winding unit 51 and the second winding unit 52 are driven by one inverter 32. In a case where similar electric power to one in a normal case is output from the inverter 32, the motor 100 is driven with torque half of that in a case of a normal operation. As a matter of course, in a case where electric power required for torque requirement is within an allowable output range of the inverter 32, electric power is output to satisfy the torque requirement.

In the configuration illustrated in FIG. 4 described in the first embodiment, in a case where the inverter 31 is failed, the motor 100 must be driven only by the second winding unit 52. For example, in a case where the coil arrangement of the winding units 51 and 52 is one illustrated in FIG. 8, a problem in which torque ripple increases will occur. However, as in the present embodiment, by switching the switch 36 to a connection state and supplying current to both the first winding unit 51 and the second winding unit 52 from the inverter 32, uniform current can be supplied to all the windings. As a result, even in a case where the coil arrangement is one illustrated in FIG. 8, torque ripple can be prevented from being increased.

As a matter of course, in a case where the winding units 51 and 52 in which windings are arranged to be magnetically balanced are employed as described in the first embodiment, the rotating electrical machine system illustrated in FIG. 5 can be applied. In this case, in a case where one inverter is failed, only one winding unit is supplied with current, and heat is generated only on one side in the configuration in FIG. 4 while each of the winding units 51 and 52 is supplied with half current in a balanced manner in the configuration in FIG. 5. In the configuration in FIG. 5, the amount of heat generation for each winding unit is ½, and the heat balance and the efficiency are improved.

Meanwhile, in a case where current is supplied from the inverter 32 to the two winding units 51 and 52, the respective phase windings are preferably configured to prevent an electrical phase difference from being generated in the windings in the same phase. The aforementioned winding units 51 and 52 illustrated in FIGS. 9 to 17 are configured to prevent an electrical phase difference from being generated in the windings in the same phase.

Although various embodiments and modification examples have been described above, the present invention is not limited to these embodiments and examples. Other aspects conceivable within the scope of the technical idea of the present invention are included in the scope of the present invention.

REFERENCE SIGNS LIST 3 magnetic pole sensor
4 stator core
5 stator coil
31, 32 inverter
33 control unit
34, 45, 46 switch
51 first winding unit
52 second winding unit
T1 to T18 tooth
100 motor
101 rotor
200 driving unit
TG1 to TG6 teeth group

The invention claimed is:

1. A rotating electrical machine comprising:
   a stator iron core including 6N teeth where an integer N≥2;
   a stator winding including concentrated windings arranged to the respective 6N teeth, wherein the stator winding includes a first three-phase winding and a second three-phase winding each of which is constituted by 3N windings and which are independent from each other, wherein the 3N windings constituting the first three-phase winding are arranged in three teeth groups each of which includes N adjacent teeth and which are provided at 120-degree pitches in terms of mechanical angle,
   a first inverter connected to the first three-phase winding;
   a second inverter connected to the second three-phase winding;
   a first opening/closing switch configured to perform connection and interruption between the first three-phase winding and the first inverter;
   a second opening/closing switch configured to perform connection and interruption between the second three-phase winding and the second inverter;
   a third opening/closing switch provided between a first connection line connecting the first opening closing switch to the first three-phase winding and a second connection line connecting the second opening/closing switch to the second three-phase winding to perform connection and interruption between the first connection line and the second connection line; and
   a control unit, in a case where the first and second inverters are normal, causing the first and second opening/closing switches to perform connection and causing the third opening/closing switch to perform interruption and, in a case where either the first or the second inverter is abnormal, causing the opening/closing switch connected to the abnormal inverter to perform interruption and causing the third opening/closing switch to perform connection.

2. The rotating electrical machine according to claim 1, wherein a configuration of the rotating electrical machine is any one of an 8-pole 12-slot configuration, a 16-pole 12-slot configuration, a 10-pole 12-slot configuration, a 14-pole 12-slot configuration, a 12-pole 18-slot configuration, a 14-pole 18-slot configuration, and a 16-pole 18-slot configuration.

3. The rotating electrical machine system according to claim 1, wherein, in the first three-phase winding and the second three-phase winding, no electrical phase difference is generated in the windings in the same phase.

* * * * *